(No Model.) 2 Sheets—Sheet 1.

N. W. PRATT.
STEAM PRESSURE GAGE.

No. 534,007. Patented Feb. 12, 1895.

(No Model.) 2 Sheets—Sheet 2.
N. W. PRATT.
STEAM PRESSURE GAGE.
No. 534,007. Patented Feb. 12, 1895.
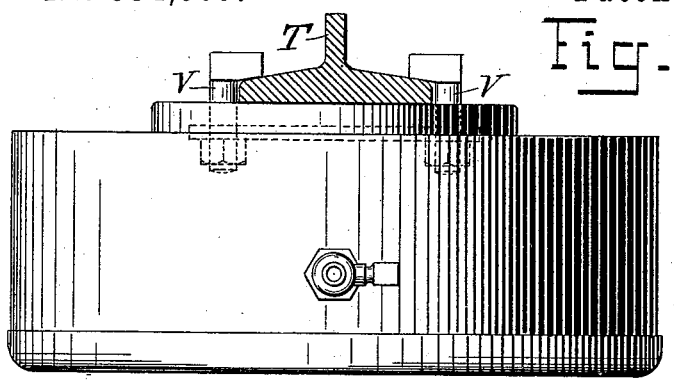
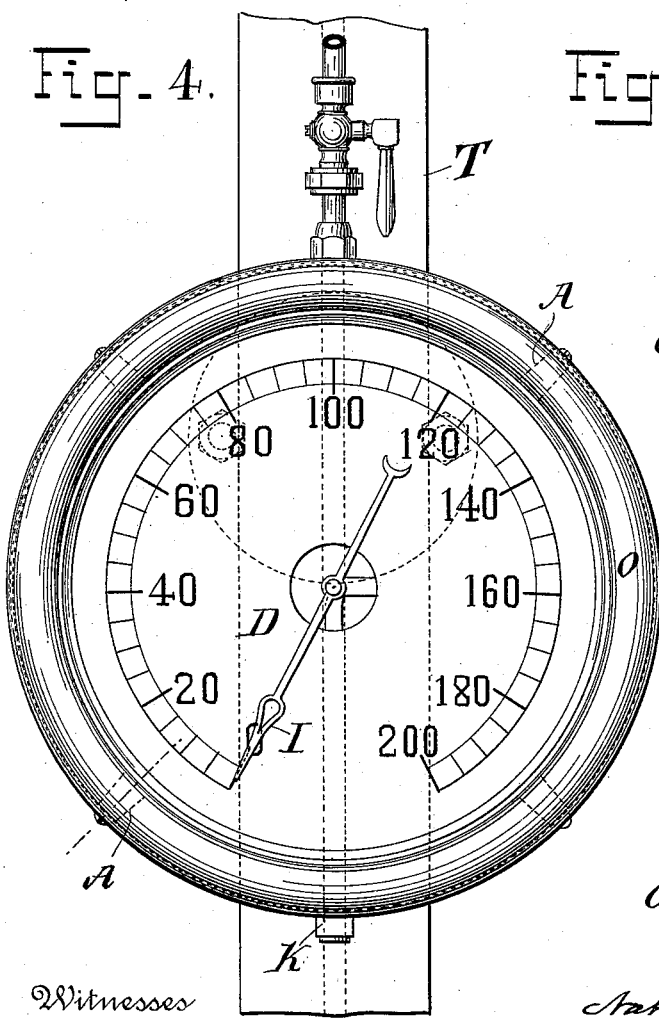
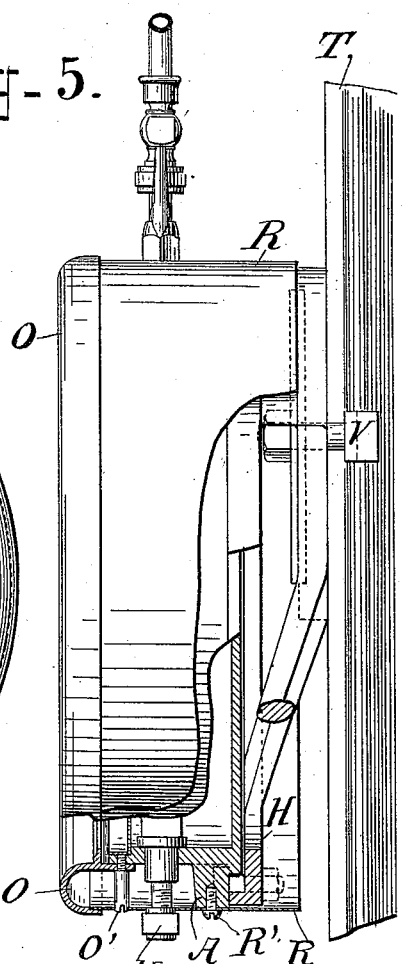
Witnesses
Chas. Hanimann,
Edson Salisbury Jones.
Nat. W. Pratt Inventor
By his Attorney
Chas. W. Forbes

UNITED STATES PATENT OFFICE.

NAT. W. PRATT, OF BROOKLYN, NEW YORK.

STEAM-PRESSURE GAGE.

SPECIFICATION forming part of Letters Patent No. 534,007, dated February 12, 1895.

Application filed March 31, 1894. Serial No. 505,912. (No model.)

*To all whom it may concern:*

Be it known that I, NAT. W. PRATT, a citizen of the United States, residing in the city of Brooklyn, Kings county, State of New York, have invented certain new and useful Improvements in Steam-Pressure Gages, of which the following is a specification.

The objects of this invention are to produce a gage whose indicating mechanism will not be affected or deranged by any expansion, contraction or movement of the case; and to combine with the gage a siphon-pipe in such a position that its presence with the gage, and its proper filling will always be assured, as well as the position of the pipe be such that it will not be injured, that it will not render the gage unsightly in appearance, and will enable steam to be taken in at the top of the gage. These objects I attain by mounting the expansion-tube and the indicating mechanism which it operates, upon a hollow standard or post, and in such a manner that said tube and mechanism have no bearings except upon the post; and in locating the siphon-pipe entirely within the gage-case, all as hereinafter described and claimed.

Figure 1:
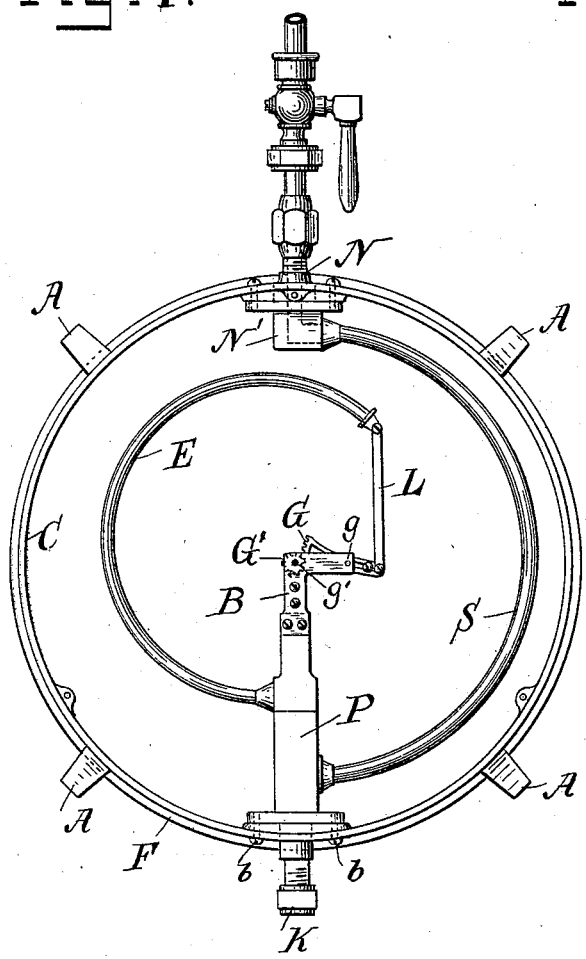
Figure 2:
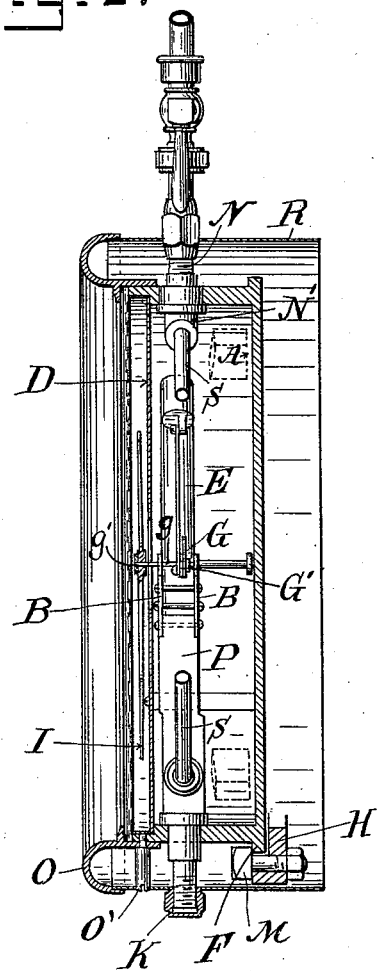

In the accompanying two sheets of drawings:—Figure 1 represents a front view of a gage embodying my invention, with the outer casing, dial, and indicating hand removed. Fig. 2 shows a central vertical section of the case, with the post, tube and indicating mechanism in elevation, the siphon-pipe being partially removed. Fig. 3 represents a top view of the gage secured to a vertical support, which is shown in horizontal section. Fig. 4 represents a front view of the same. Fig. 5 shows a side view of the gage with its case partly broken away and partially in section.

C represents the body-portion or case of the gage which is cup-shape, is provided with the usual dial D, the surrounding front rim O secured in place by screws O', Fig. 2, and exterior sheet-metal casing R, which is attached to the body in any suitable manner, as by screws R', Fig. 5.

The attachment of the gage to a support, as a column T, forms no part of the present invention, but the case C is shown as provided with a flange F and ears A, which flange is engaged by bolts M, Fig. 2, to clamp the ears on the case to a bracket H, which is attached to the column T by bolts V, Figs. 3 and 5.

To the body of the case C is secured (in any suitable manner, as by screws *b*, Fig. 1) a hollow standard or post P, which is closed at the top, and at the bottom by a removable cap K. To this post, one end of the curved expansion-tube E is attached, the bore of the tube communicating with the interior of the post. The upper or free end of the tube is closed, and to it is pivoted a link L, the lower end of which is pivoted to the tail of the sector-gear G, whose bearing-pin *g* is journaled in two plates or upward extensions B of the post P as shown in Figs. 1 and 2. The gear G meshes with a pinion G', the shaft *g'* of which is also journaled in the plates B and carries upon its outer end the indicating hand I.

Steam is introduced at the top of the gage through the inlet pipe N and elbow N', to which latter the upper end of the interiorly located siphon pipe S is attached, the lower end of which is connected to the hollow post P, so that the steam passes into the expansion tube, condenses therein in the post P and in the pipe S and charges them with water.

As is well known, the expansion and contraction of the tube E causes the hand I to indicate the amount of pressure.

From the foregoing it will be seen and understood that, as the indicating mechanism is all mounted on the post P, and out of contact with the case, any movement or expansion of the gage-case due to a heating of the same will in no way disturb or affect such indicating mechanism; and the location of the siphon pipe insures its use with the gage and a proper filling of it, besides dispensing with the usual external siphon which causes a gage to be unsightly in appearance, and renders the siphon liable to damage by accident.

What I claim as my invention, and desire to secure by Letters Patent, is—

1. In a pressure-gage having a steam inlet, an interior expansion-tube and connected indicating-mechanism, a siphon-pipe located entirely within the gage-casing and independent thereof, and forming a connection between the steam inlet and the expansion-tube, substantially as set forth.

2. In a pressure-gage having a steam inlet, the combination of a body or case, a hollow post mounted on said case; an expansion-tube and connected indicating-mechanism mounted on said post out of contact with the body; and a siphon-pipe located upon the interior of the casing, independent thereof, and forming a communication between the steam inlet and the hollow post, substantially as set forth.

NAT. W. PRATT.

Witnesses:
   H. T. DE PUY,
   EDSON SALISBURY JONES.